US012798282B2

(12) United States Patent
Yoshida

(10) Patent No.: US 12,798,282 B2
(45) Date of Patent: Nov. 17, 2026

(54) FILE

(71) Applicant: KOKUYO Co., Ltd., Osaka (JP)

(72) Inventor: Shinpei Yoshida, Osaka (JP)

(73) Assignee: Kokuyo Co., Ltd., Osaka (JP)

( * ) Notice: Subject to any disclaimer, the term of this patent is extended or adjusted under 35 U.S.C. 154(b) by 77 days.

(21) Appl. No.: 18/856,257

(22) PCT Filed: Apr. 26, 2023

(86) PCT No.: PCT/JP2023/016425
§ 371 (c)(1),
(2) Date: Oct. 11, 2024

(87) PCT Pub. No.: WO2023/228671
PCT Pub. Date: Nov. 30, 2023

(65) Prior Publication Data
US 2026/0070366 A1 Mar. 12, 2026

(30) Foreign Application Priority Data
May 25, 2022 (JP) ................................ 2022-085589

(51) Int. Cl.
*B42F 13/24* (2006.01)
*B42F 13/00* (2006.01)
*B42F 13/26* (2006.01)

(52) U.S. Cl.
CPC ............ *B42F 13/26* (2013.01); *B42F 13/006* (2013.01); *B42F 13/0073* (2013.01); *B42F 13/008* (2013.01); *B42F 13/24* (2013.01)

(58) Field of Classification Search
CPC ................ B42F 13/006; B42F 13/0073; B42F 13/008; B42F 13/24
USPC ........................................ 402/34, 39, 42, 75
See application file for complete search history.

(56) References Cited

U.S. PATENT DOCUMENTS 763,583 A * 6/1904 Williams ................ B42F 13/24
402/35

FOREIGN PATENT DOCUMENTS

| | | | | |
|---|---|---|---|---|
| CA | 2319369 A1 * | 8/1999 | | B42F 13/22 |
| DE | 2540340 A1 * | 4/1977 | | |
| EP | 1657078 A1 * | 5/2006 | | B42F 13/24 |
| EP | 2524815 A2 * | 11/2012 | | B42F 13/16 |

(Continued)

OTHER PUBLICATIONS

CA 2,319,369 English Translation (Year: 1999).*

(Continued)

*Primary Examiner* — Kyle R Grabowski
(74) *Attorney, Agent, or Firm* — McGinn IP Law Group, PLLC

(57) ABSTRACT

A file having the configuration that allows the file to suitably take a spread posture and a closed posture of a cover is provided.
The file is configured to be capable of changing a posture of the file such that a cover A can take a spread posture (H) and a closed posture. A binder B includes: front and rear binding rings R(f), R(r) that are configured to be capable of taking an open posture (P) and a closed posture; and a base portion d2 mounted on an inner surface of a spine cover 3. A front cover 1 and a back cover 2 have first and second communication holes a1, a2 that allow the front and rear binding rings R(f), R(r) to pass therethrough thus enabling the cover A to perform the posture change between the spread posture (H) and the closed posture.

15 Claims, 16 Drawing Sheets

(56) References Cited

FOREIGN PATENT DOCUMENTS

| | | | | | |
|---|---|---|---|---|---|
| FR | 2731947 | A1 | * | 9/1996 | ............ B42F 13/008 |
| JP | 2603916 | Y2 | * | 4/2000 | |
| JP | 2002-502728 | A | | 1/2002 | |
| JP | 2007-152927 | A | | 6/2007 | |
| JP | 2015-77789 | A | | 4/2015 | |
| JP | 2016-107546 | A | | 6/2016 | |
| JP | 2020-23134 | A | | 2/2020 | |
| JP | 6681742 | B2 | | 4/2020 | |
| JP | 2022-10798 | A | | 1/2022 | |
| WO | WO-2017042952 | A1 | * | 3/2017 | .............. B42F 13/18 |

OTHER PUBLICATIONS

FR 2,731,947 English Translation (Year: 1996).*
International Search Report (Isr) (PCT Form PCT/ISA/210), in PCT/JP2023/016425, dated Jun. 6, 2023 (English Version).
Japanese Office Action dated Feb. 10, 2026 in Japanese Patent Application No. 2022-085589 with JPO machine English translation.

* cited by examiner

FILE

TECHNICAL FIELD

The present invention relates to a file that includes a cover and a binder.

BACKGROUND ART

Conventionally, there have been known various files each of which includes a cover and a binder (see patent literature 1).

Among the files of this type, there has been known the file having the configuration where a proximal portion of a binder is mounted on an outer surface of a spine cover.

In the file having such a configuration, due to the presence of the proximal portion having a fixed size, it is difficult for the file to stably take a spread state where a front cover and a back cover become substantially coplanar with each other on a placing surface of a top board or the like.

Further, when the file is not used, it is desirable that the file take a closed posture where an inner surface of the front cover and an inner surface of the back cover are capable of facing each other without being affected by the presence of the binder.

CITATION LIST

Patent Literature

[Patent Literature 1] Japanese U.S. Pat. No. 6,681,742

SUMMARY OF INVENTION

Technical Problem

The present invention has been made by focusing on the above-mentioned circumstances, and it is an object of the present invention to provide a file having the configuration that allows the file to suitably take at least a spread posture and a closed posture of a cover.

Solution to Problem

That is, the present invention has the following configurations.

The invention according to claim 1 is directed to a file including a cover and a binder, wherein the cover has a front cover, a spine cover and a back cover that are connected to each other by way of a hinge portion, and is configured to be capable of performing a posture change such that the cover takes a spread posture where the front cover and the back cover can be spread approximately in a coplanar manner and a closed posture where the respective inner surfaces of the front cover and the back cover can face each other, the binder includes: a binding ring configured to be capable of taking an open posture and a closed posture; and a base portion mounted on an inner surface of the spine cover, and the front cover and the back cover each include a communication hole that allows the binding ring to pass therethrough thus enabling the cover to perform the posture change between the spread posture and the closed posture.

The invention according to claim 2 is, in the file according to claim 1, characterized in that the file further comprises a mounting jig that mounts the base portion on the inner surface of the spine cover, wherein the mounting jig includes: a mounting base disposed on an outer surface side of the spine cover; and an engaging protruding portion protruding from the mounting base, penetrating the spine cover, and engaging with an engaging portion formed on the base portion.

The invention according to claim 3 is, in the file according to claim 2, characterized in that the engaging protruding portion is formed in a protruding manner on both end portions of the mounting base in a longitudinal direction, and the engaging protruding portions engage with the engaging portions in a fixedly fitting state.

The invention according to claim 4 is, in the file according to claim 1, characterized in that a lateral width size of the spine cover is set approximately equal to or longer than a lateral width size of the base portion, and a lateral width size of the spine cover is set approximately equal to or shorter than a lateral width size of a binding ring.

The invention according to claim 5 is, in the file according to claim 1, characterized in that the cover is configured to be capable of performing a posture change so as to take a folded posture where an outer surface of the front cover and an outer surface of the back cover face each other.

The invention according to claim 6 is, in the file according to claim 1, characterized in that the binder includes: a first binder member having the base portion and a first ring forming portion that extends from the base portion and forms the binding ring; and a second binder member provided with a second ring forming portion that forms the binding ring, wherein the second binder member is configured to be rotatable relative to the first binder member so as to take the closed posture where the distal end portion of the first ring forming portion and the distal end portion of the second ring forming portion engage with each other and the open posture where the distal end portion of the first ring forming portion and the distal end portion of the second ring forming portion are spaced apart from each other.

The invention according to claim 7 is, in the file according to claim 6, characterized in that the first binder member and the second binder member are respectively made of a synthetic resin.

Advantageous Effects of Invention

As described above, according to the present invention, it is possible to provide a file having the configuration that allows the file to suitably take at least a spread posture and a closed posture of a cover.

DESCRIPTION OF EMBODIMENTS

Figure 1:
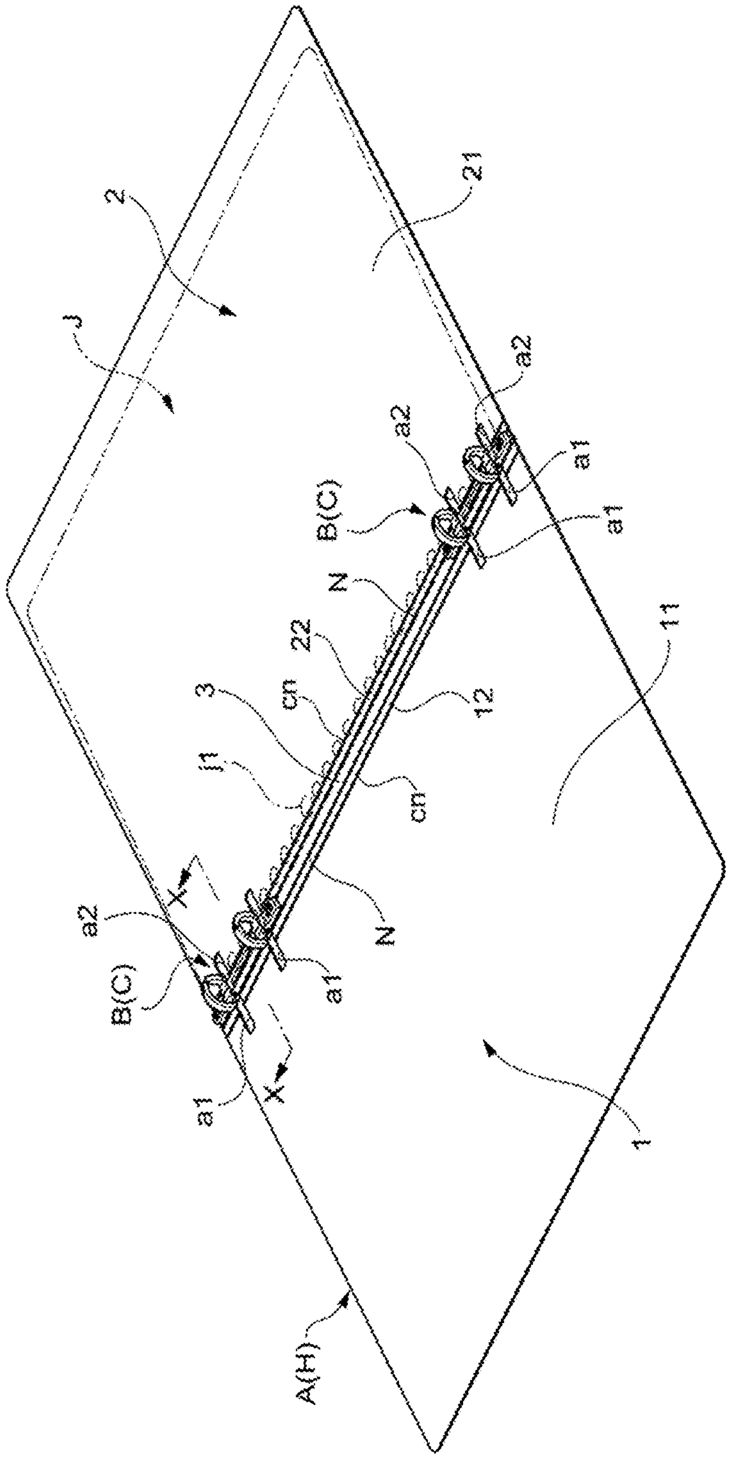
FIG. 1 is a perspective view illustrating an embodiment of the present invention
Figure 2:
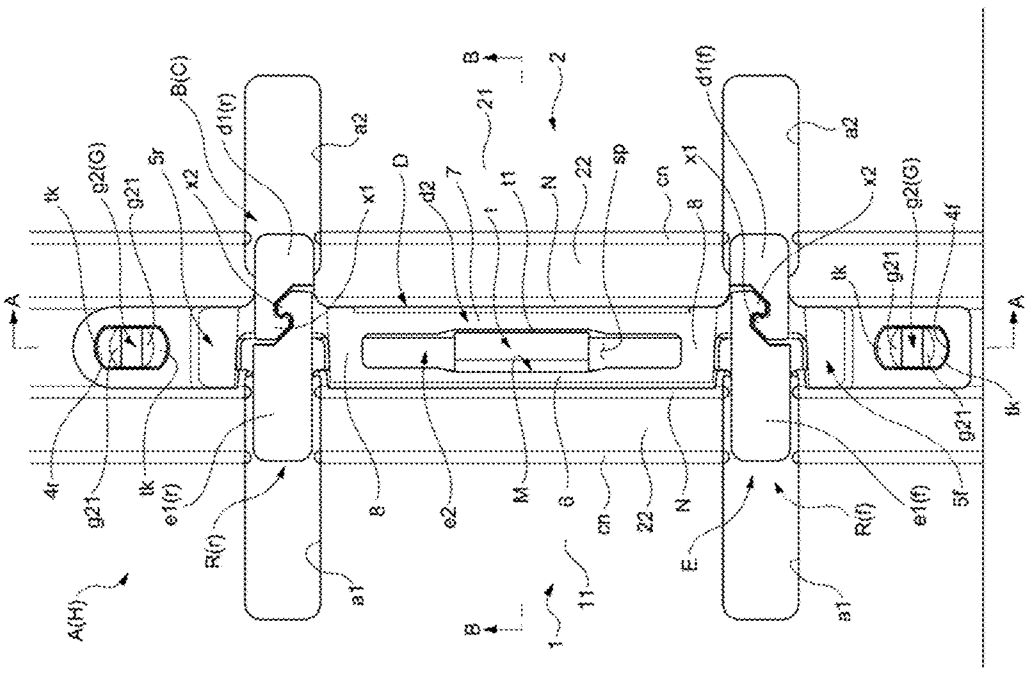
FIG. 2 is a plan view illustrating the embodiment.
Figure 3:
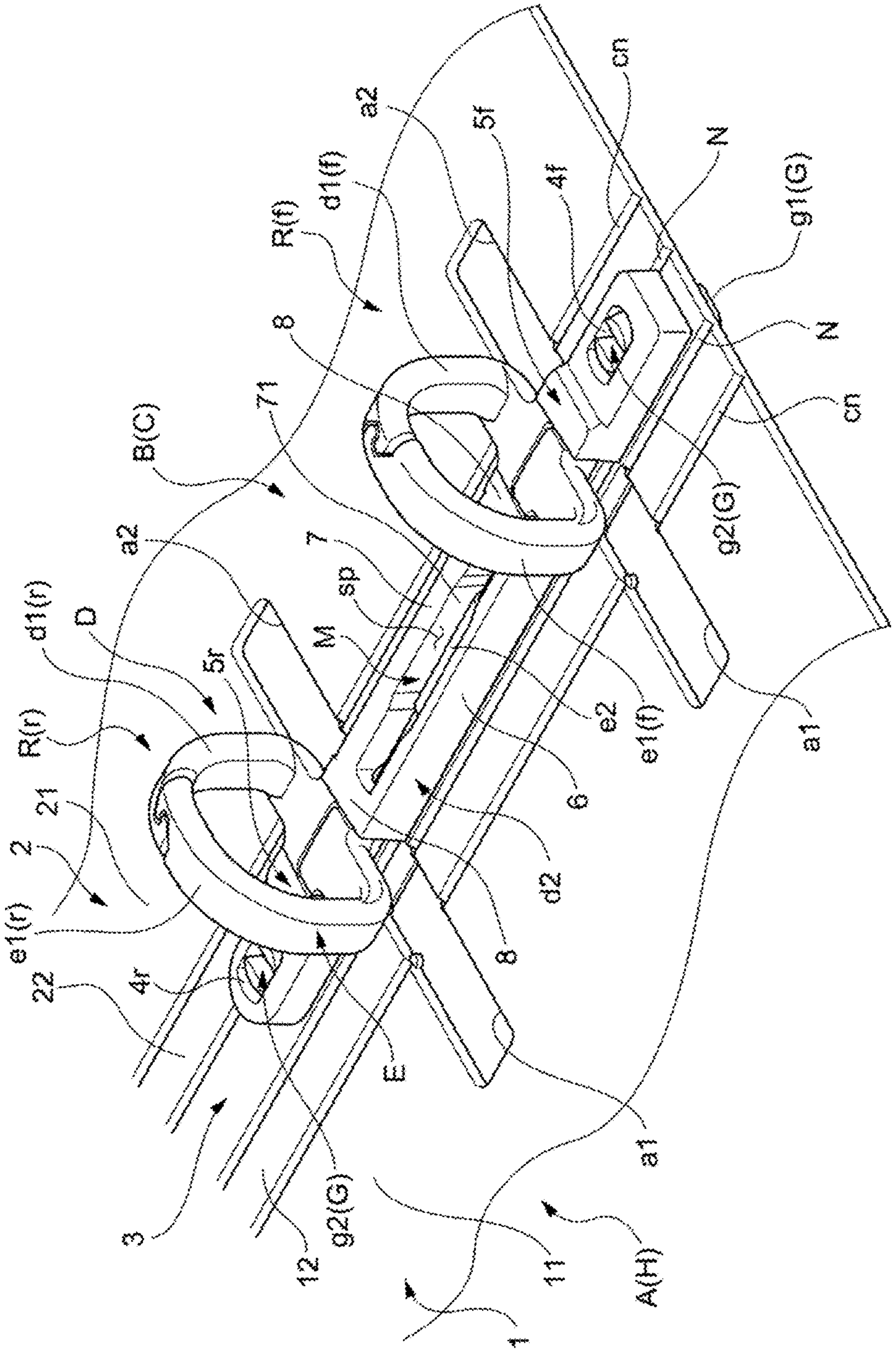
FIG. 3 is a perspective view illustrating the embodiment.
Figure 4:
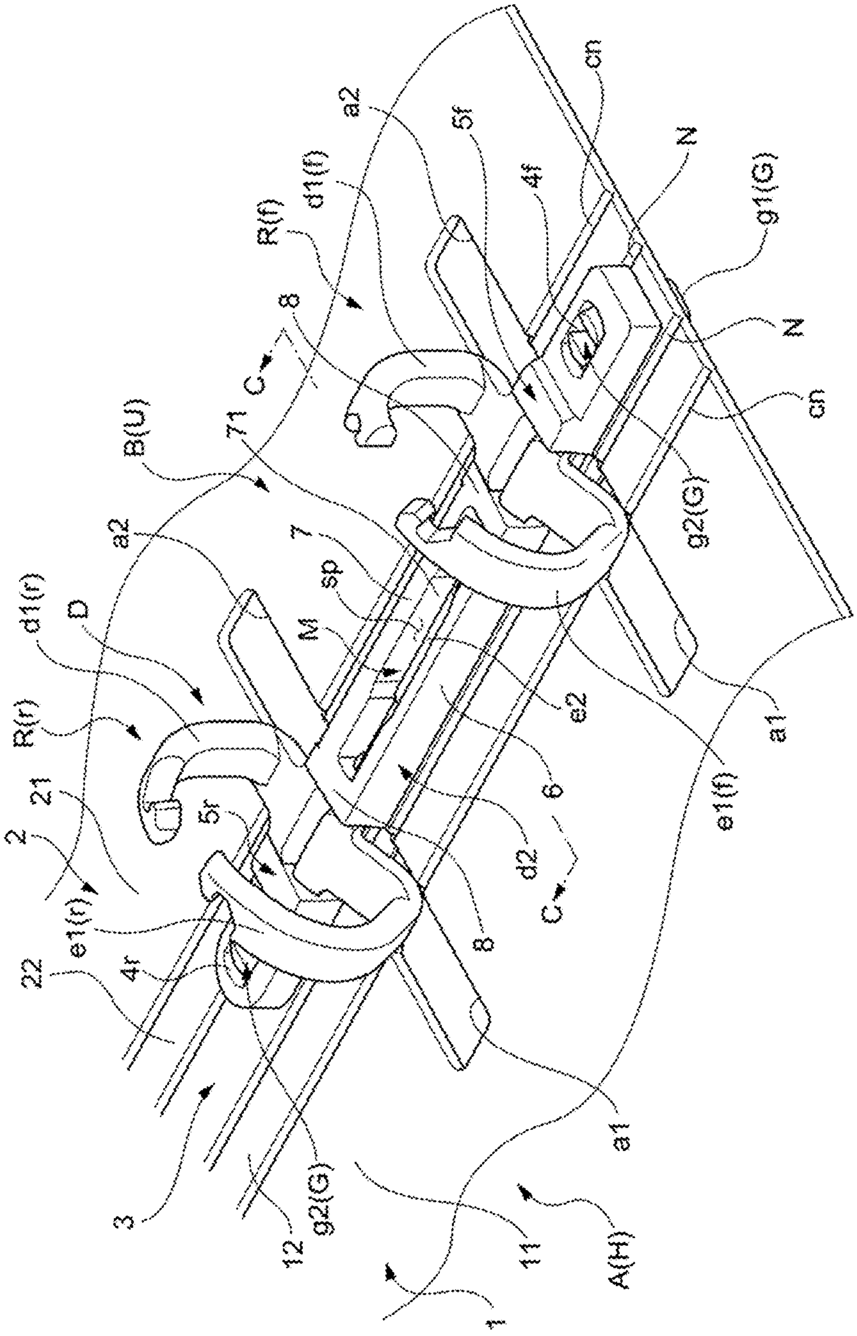
FIG. 4 is a perspective view illustrating the embodiment.
Figure 5:
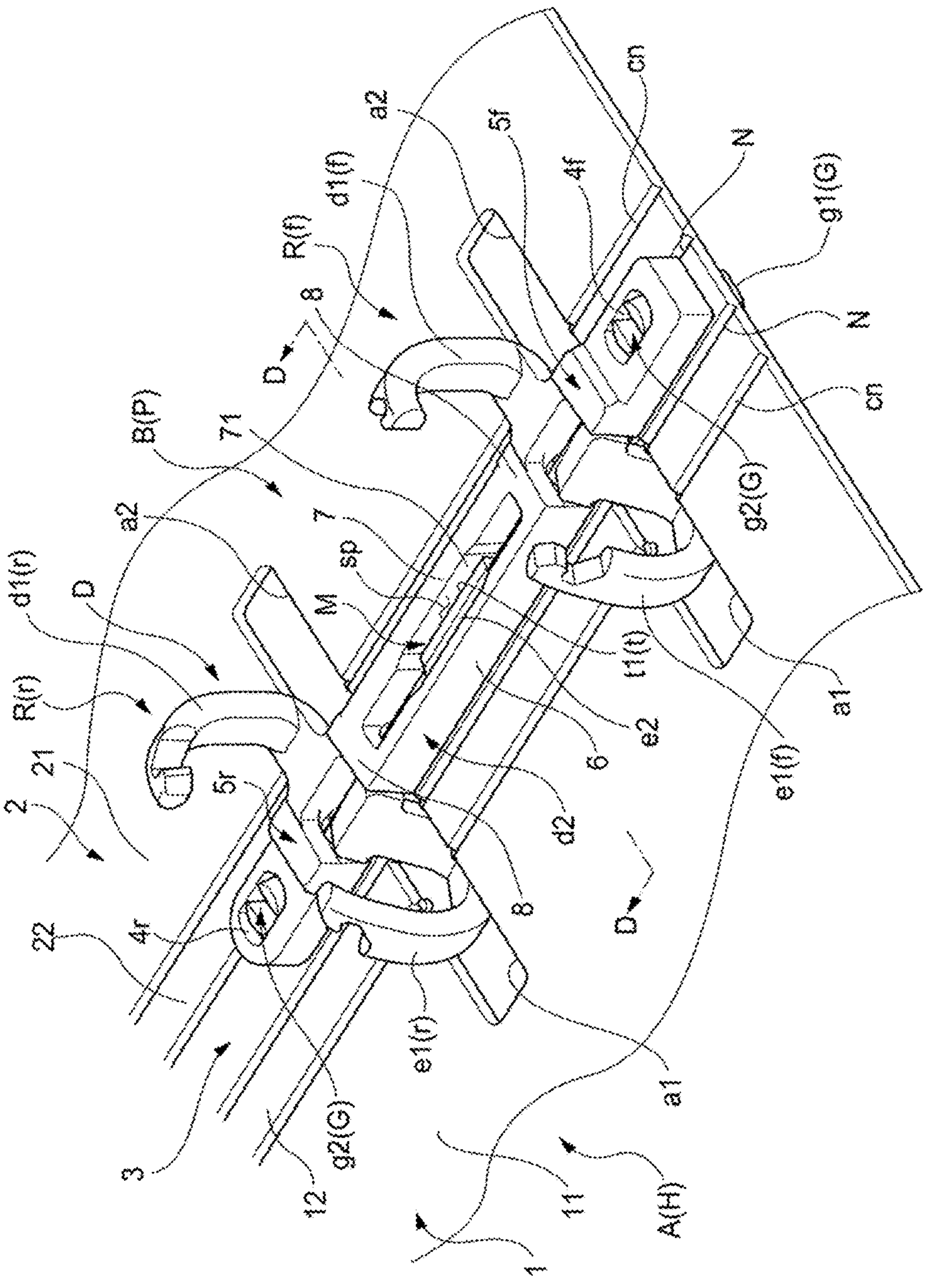
FIG. 5 is a perspective view illustrating the embodiment.
Figure 6:
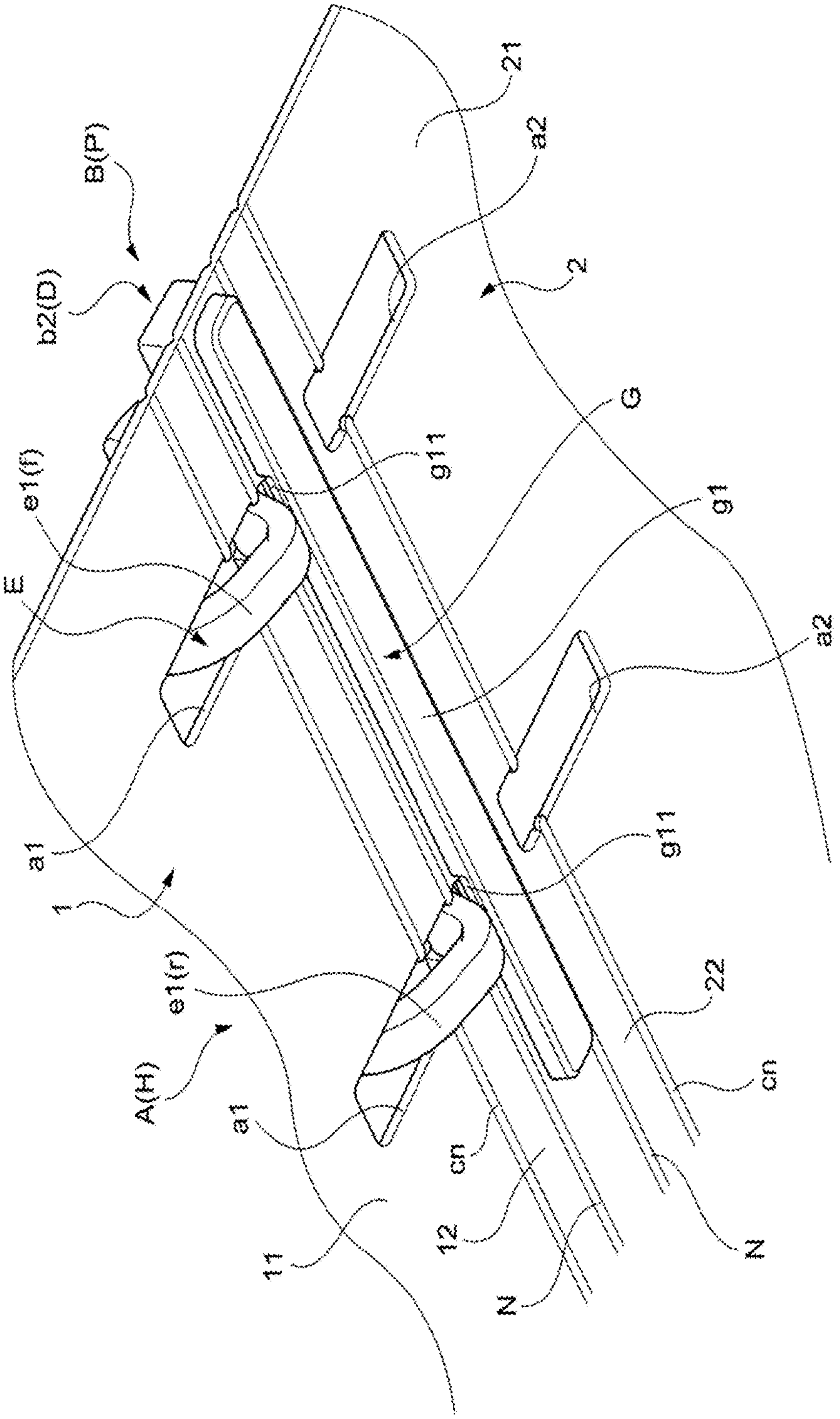
FIG. 6 is a perspective view illustrating the embodiment.
Figure 7:
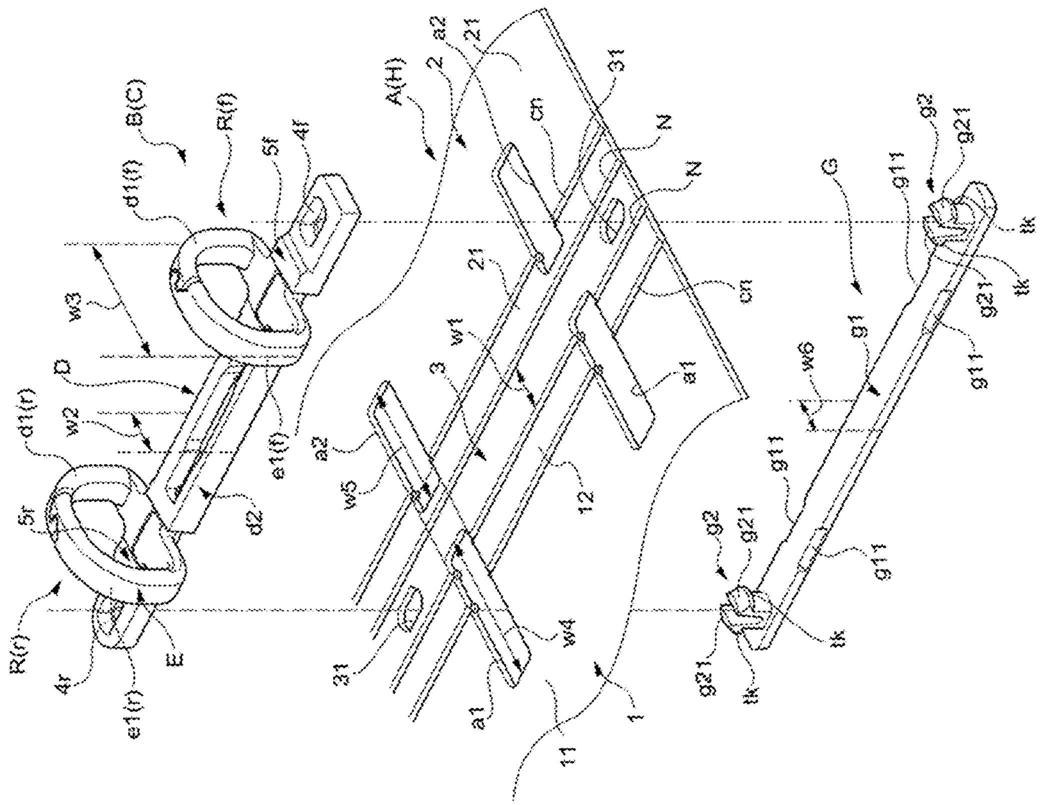
FIG. 7 is an exploded perspective view illustrating the embodiment.
Figure 8:
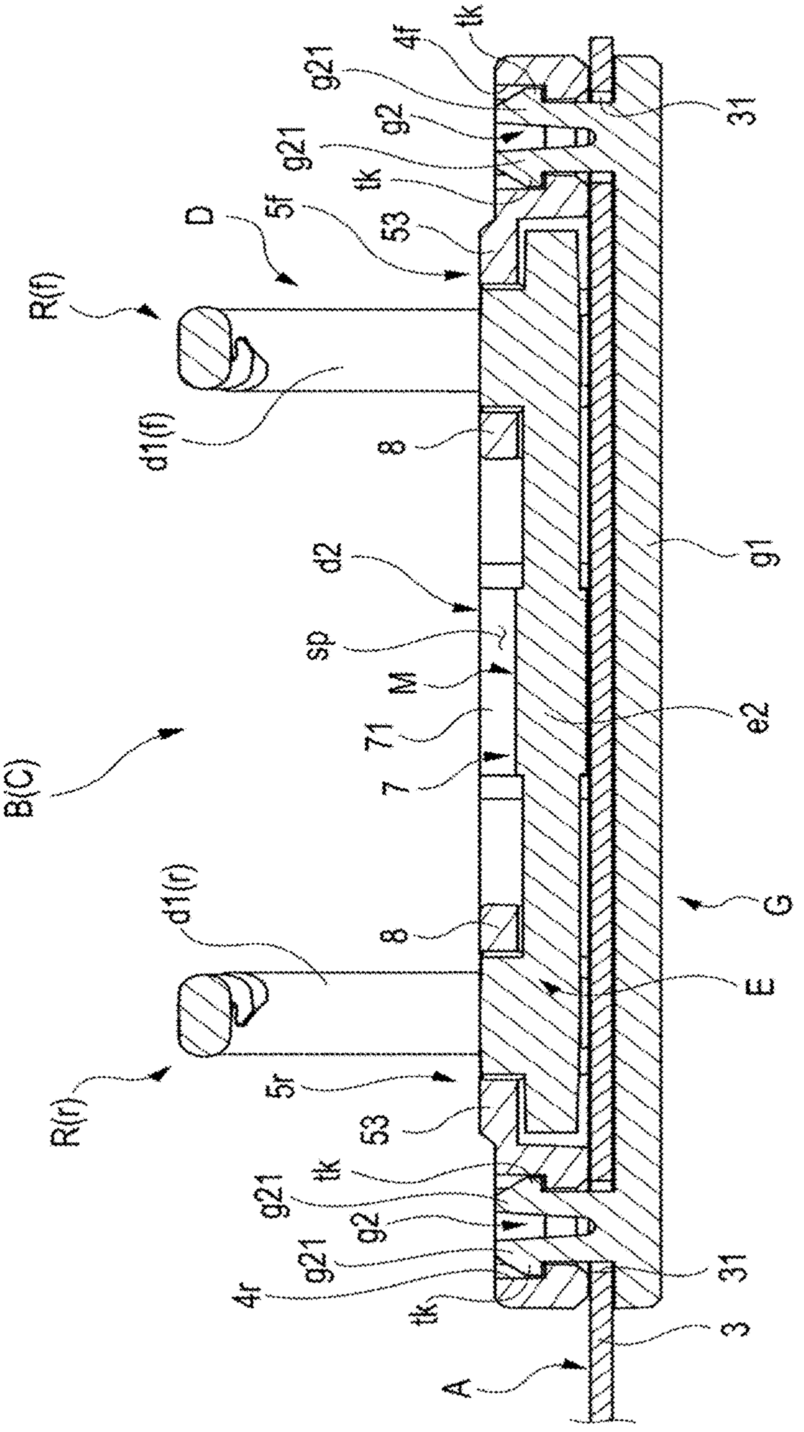
FIG. 8 is a cross-sectional view taken along a line A-A in FIG. 2.
Figure 9:
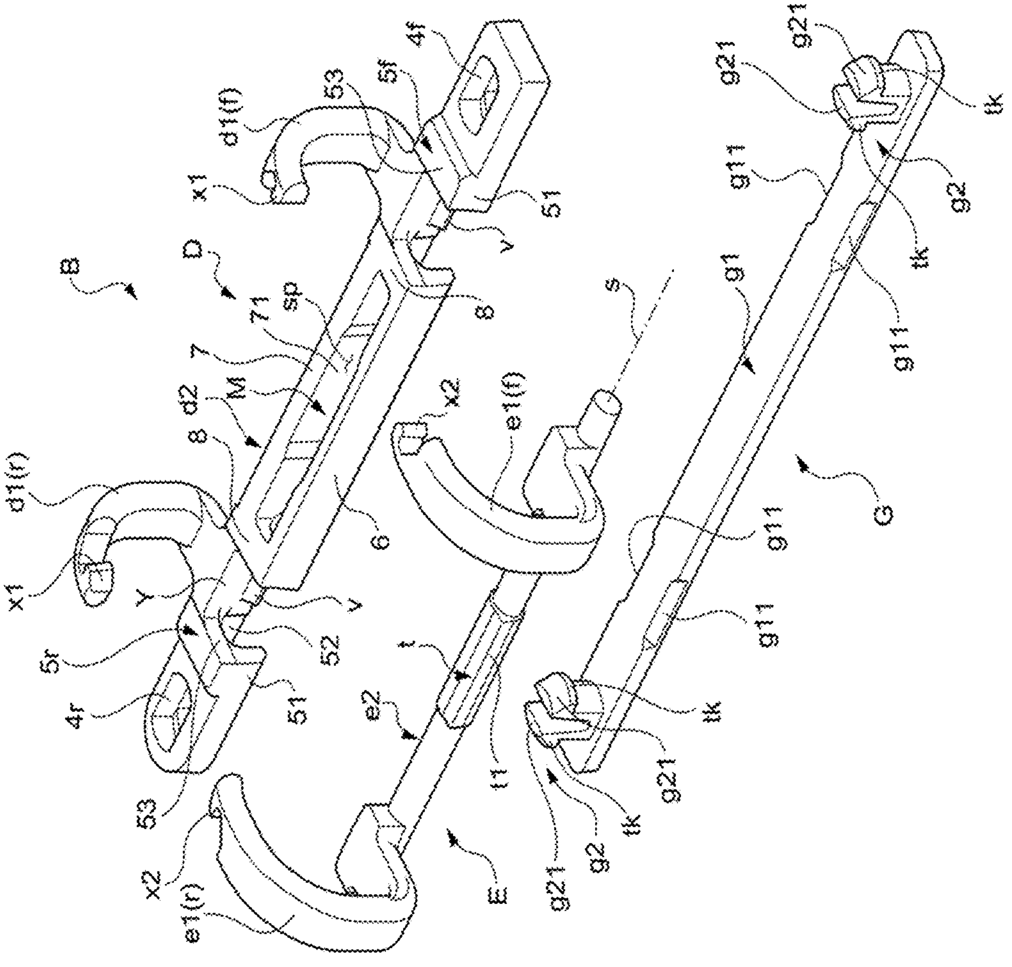
FIG. 9 is an exploded perspective view according to the embodiment
Figure 10:
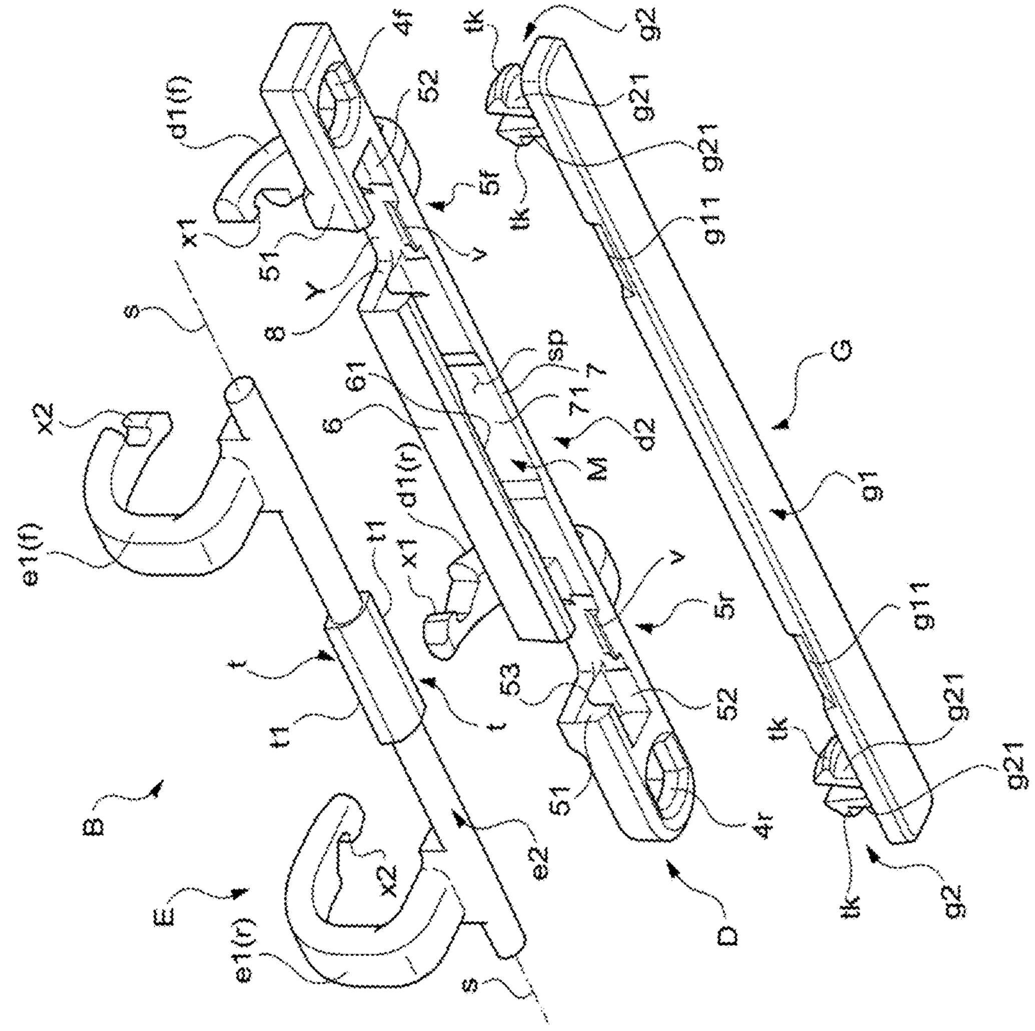
FIG. 10 is an exploded perspective view according to the embodiment.
Figure 11:
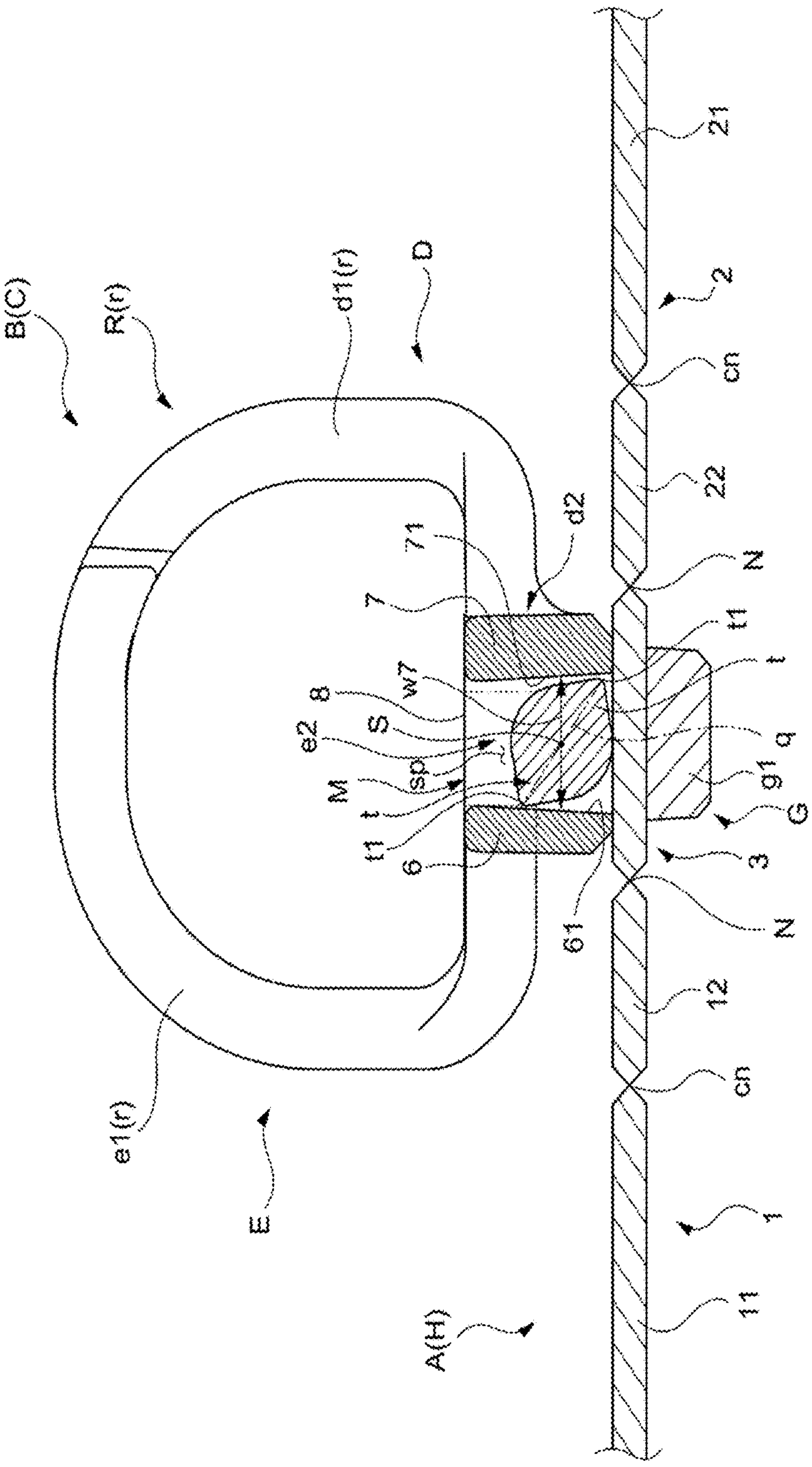
FIG. 11 is a cross-sectional view taken along a line B-B in FIG. 2.
Figure 12:
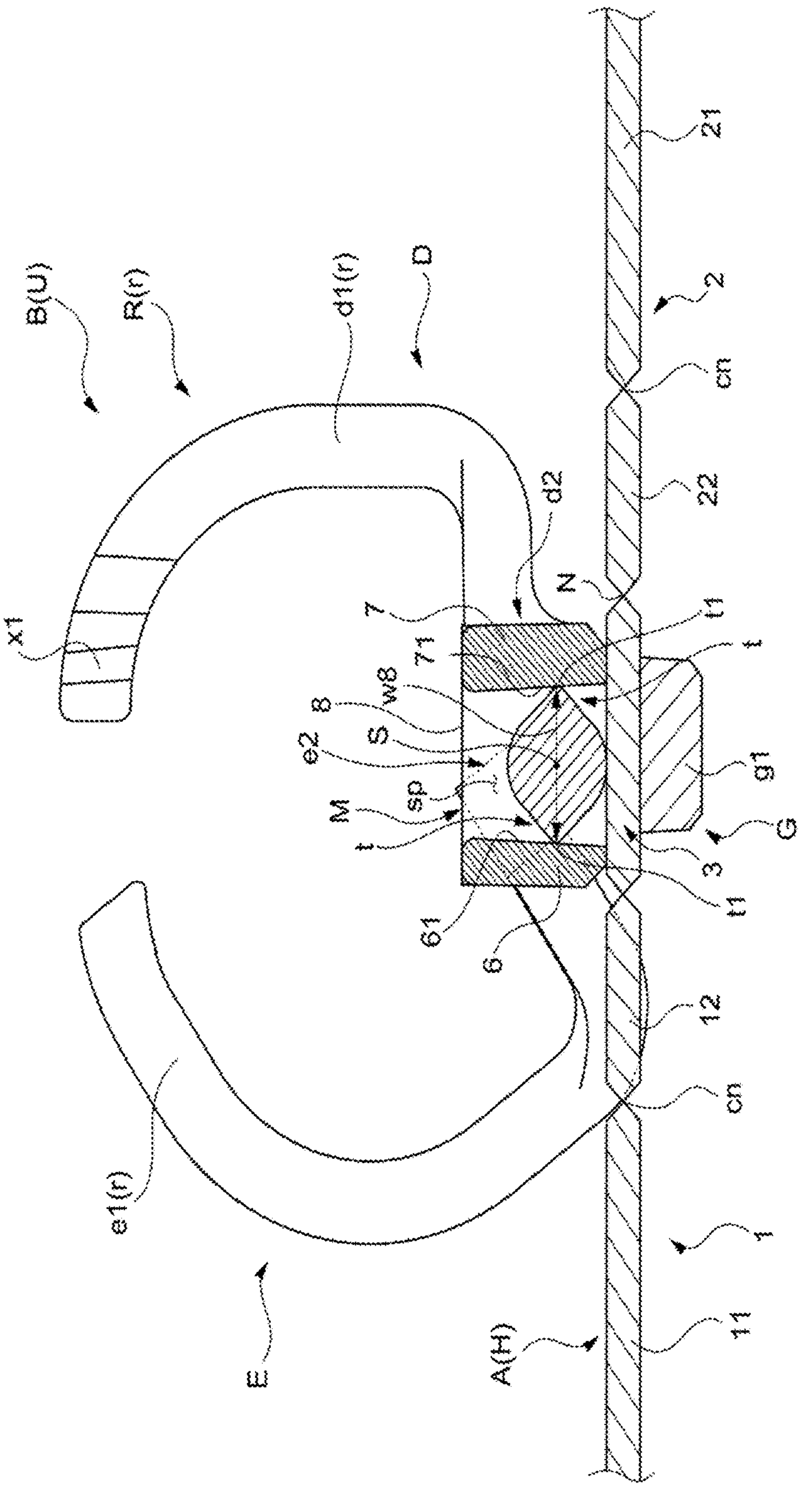
FIG. 12 is a cross-sectional view taken along a line C-C in FIG. 4.
Figure 13:
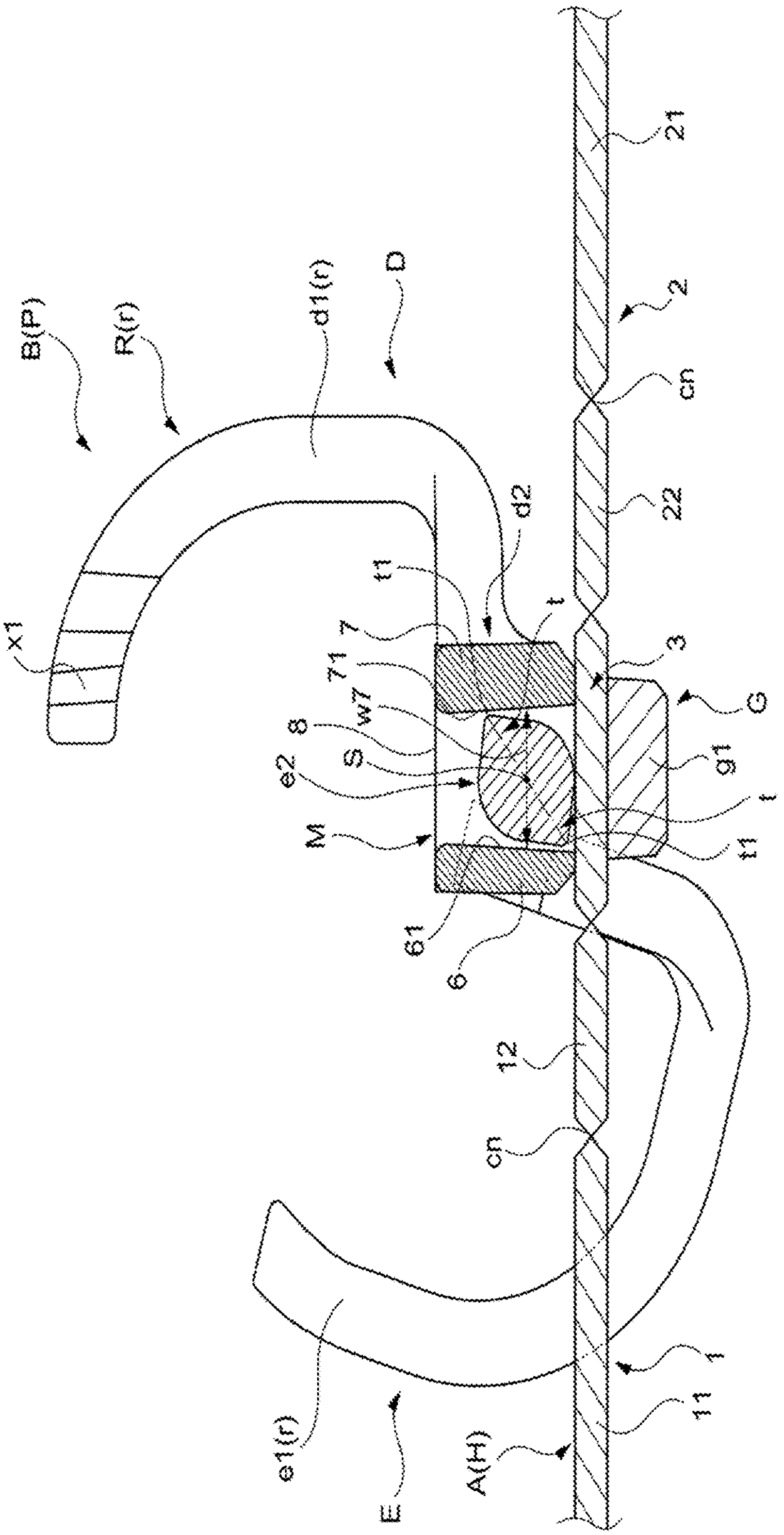
FIG. 13 is a cross-sectional view taken along a line D-D in FIG. 5.
Figure 14:
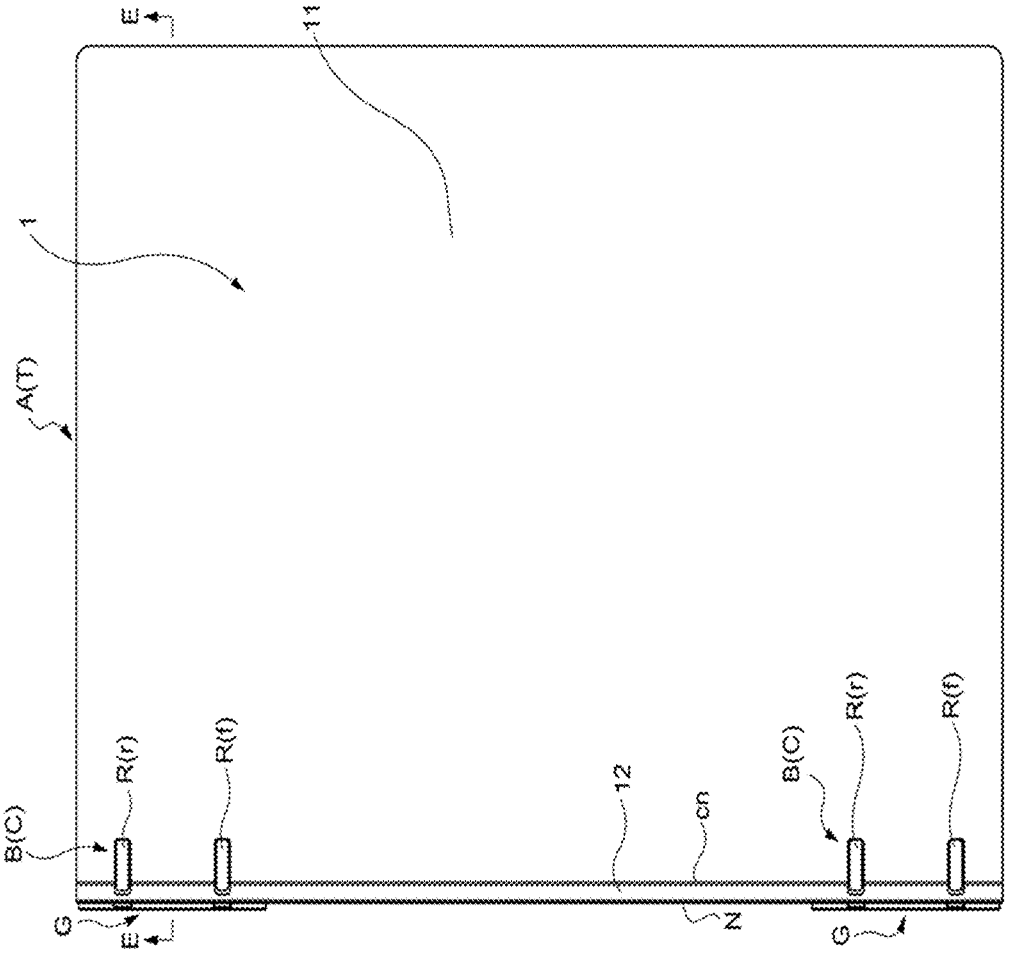
FIG. 14 is a left side view according to the embodiment.
Figure 15:
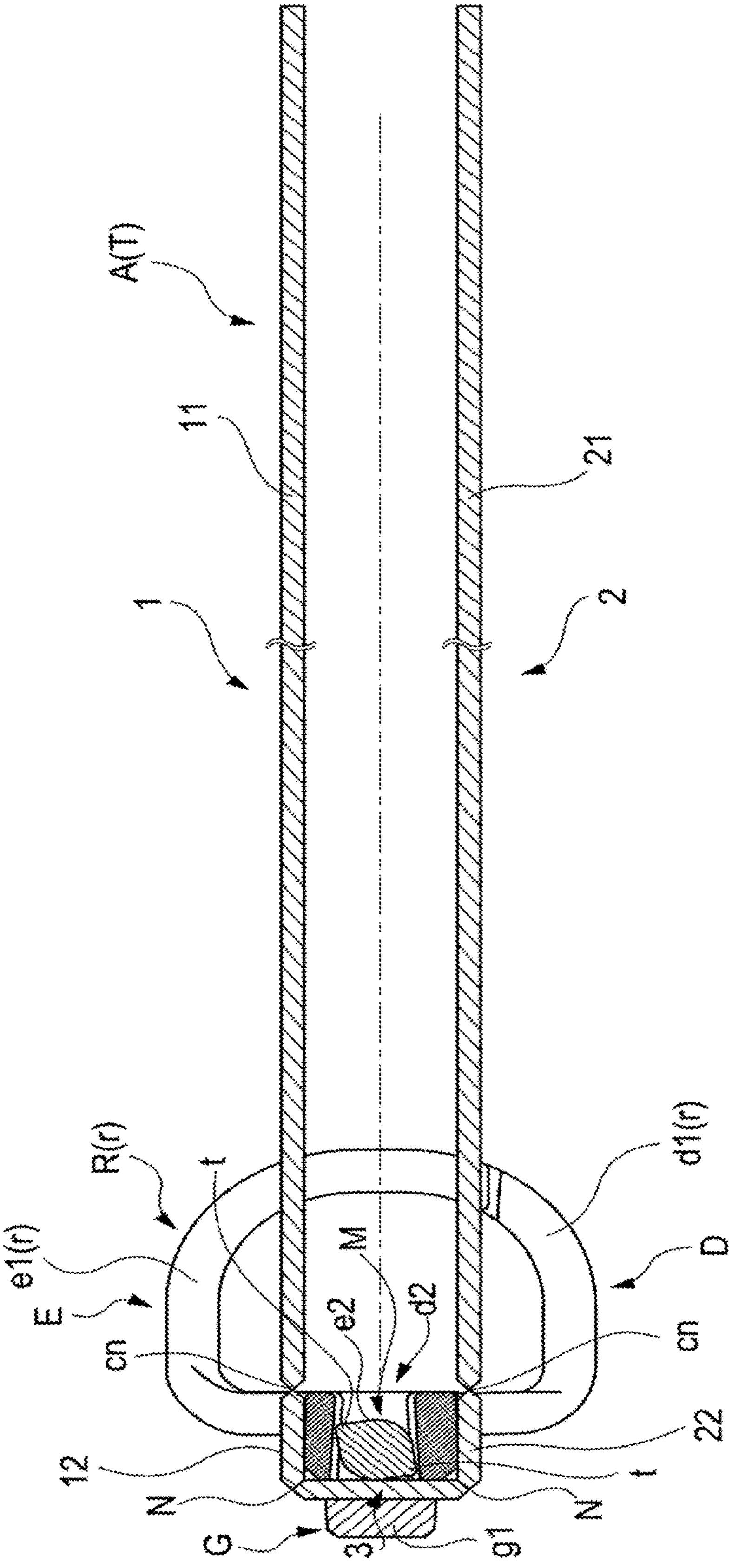
FIG. 15 is a cross-sectional view taken along a line E-E in FIG. 14.
Figure 16:
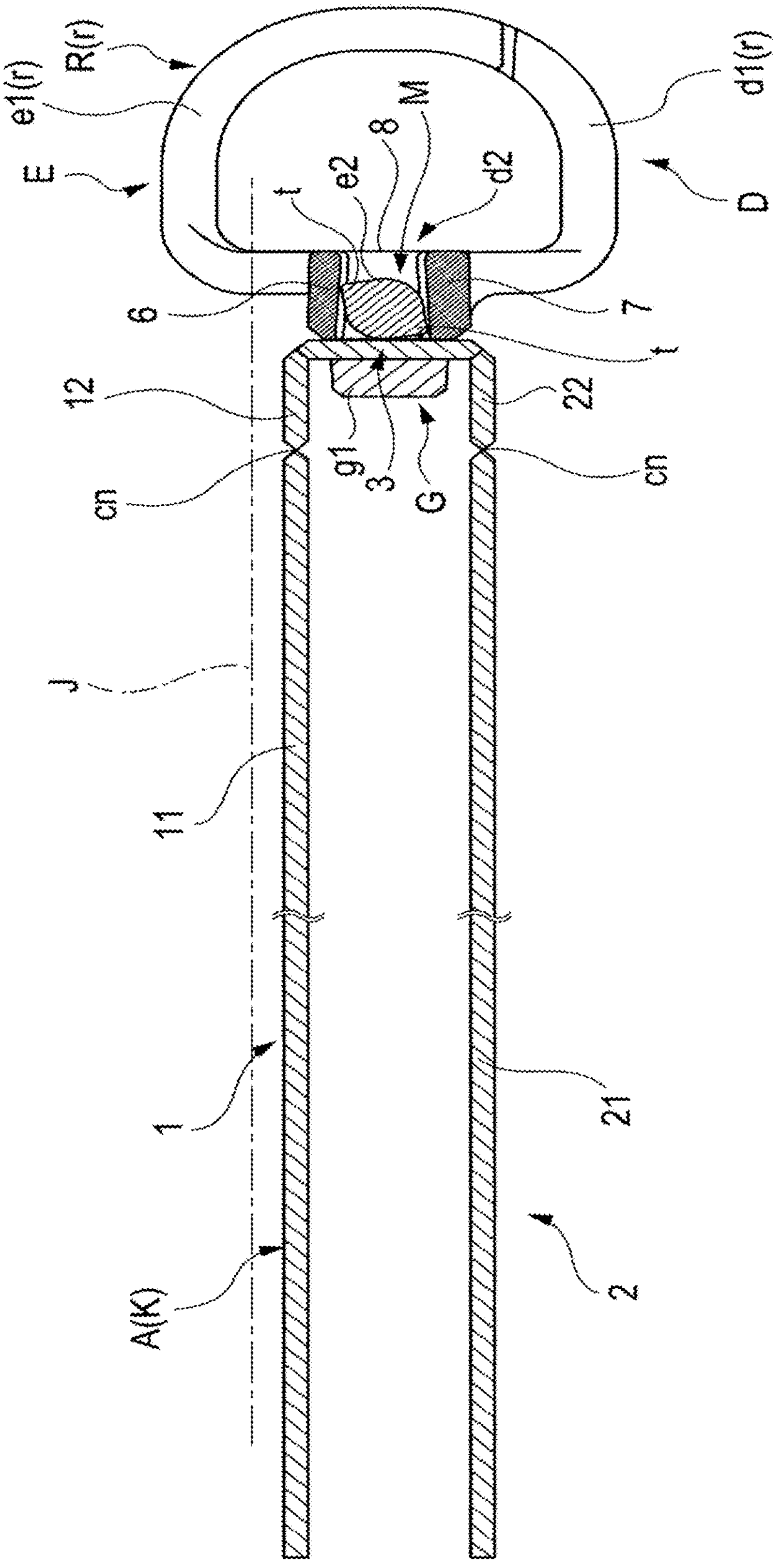
FIG. 16 is a cross-sectional view illustrating a case where a cover takes a folded posture (a cross-sectional view taken along the same cross-section line as FIG. 15).

Hereinafter, one embodiment of the present invention is described with reference to FIG. 1 to FIG. 16. The upward and downward directions, the left and right directions and the longitudinal direction used in this embodiment are set for the sake of convenience of the description.

In this embodiment, the present invention is applied to a binder B that can bind articles to be bound J such as papers each having binding holes j1 (hereinafter, simply referred to as "bound articles J"), and a file having the binder B.

The file includes a cover A, and two binders B that are mounted on an inner surface of a spine cover 3 of the cover A. Two binders B respectively have the same structure. Two binders B are mounted on a front end portion as viewed from a viewer (front end portion) and a back end portion (rear end portion) of the spine cover 3 in a spaced-apart manner from each other using mounting jigs G.

Hereinafter, the respective constitutional elements of the file are described in detail.

<<Cover A>>

The cover A includes a front cover 1, the spine cover 3 and a back cover 2 connected to each other in a relatively rotatable manner by way of hinge portions N. The cover A is made of a synthetic resin and is formed in a sheet shape.

The cover A is capable of performing a posture change so that the cover A can take a spread posture (H), a closed posture (T) and a folded posture (K). In the spread posture (H), the front cover 1, the spine cover 3 and the back cover 2 can be spread to be coplanar with each other on a mounting surface of a top plate or the like. In the closed posture (T), respective inner surfaces of the front cover 1 and the back cover 2 can face each other. In the folded posture (K), the respective outer surfaces of the front cover 1 and the back cover 2 can face each other.

<Front Cover 1>

The front cover 1 has an approximately rectangular shape as a whole. The front cover 1 includes: a proximal end front cover portion 12 disposed adjacent to the spine cover 3 by way of hinge portions N; and a front cover body portion 11 connected to the proximal end front cover portion 12 by way of an intermediate hinge portion cn.

In this embodiment, the front cover 1 consists of the front cover body portion 11, the intermediate hinge portion cn, and the proximal end front cover portion 12. That is, the intermediate hinge portion cn is mounted on the front cover 1. With such a configuration, with respect to the front cover 1 in a closed posture (T), the relative posture between the front cover body portion 11 and the proximal end front cover portion 12 can be flexibly changed corresponding to an amount, the number, the size or the like of bound articles J that are bound by the binder B.

The proximal end front cover portion 12 has a lateral width size that is set approximately equal to or shorter than a lateral width size w1 of the spine cover 3. In this embodiment, the lateral width size of the proximal end front cover portion 12 is set shorter than the lateral width size w1 of the spine cover 3. The front cover body portion 11 forms a main portion of the front cover 1.

The front cover 1 includes first communication holes a1 that are communication holes allowing binding rings R(f), R(r) disposed on a front side and a rear side of the binder B to pass therethrough such that the front cover 1 can change its posture between the spread posture (H) and the closed posture (T). The first communication holes a1 allow left portions that form the binding rings R(f), R(r) disposed on the front side and the rear side of the binder B, that is, second ring forming portions e1(*f*), e1(*r*) disposed on the front side and the rear side of the binder B, to pass therethrough.

The first communication holes a1 are formed not only in the front cover body portion 11 and the proximal end front cover portion 12 that form the front cover 1 but also in the spine cover 3 disposed on an extension of the front cover 1 corresponding to movable regions of the second ring forming portions e1(*f*), e1(*r*) disposed on the front side and the rear side of the binder B that are movable about shaft portions e2. A size w4 of the first communication holes a1 in the lateral direction is set longer than a size w5 of the second communication holes a2 described later in the lateral direction.

<Back Cover 2>

The back cover 2 has an approximately rectangular plate shape as a whole. The back cover 2 includes: a proximal end back cover portion 22 disposed adjacent to the spine cover 3 by way of hinge portions N; and a back cover body portion 21 connected to the proximal end back cover portion 22 by way of the intermediate hinge portions cn.

In this embodiment, the back cover 2 consists of the back cover body portion 21, the intermediate hinge portion cn and the proximal end back cover portion 22. That is, the intermediate hinge portion cn is mounted on the back cover 2. With such a configuration, with respect to the back cover 2 in a closed posture (T), the relative posture between the back cover body portion 21 and the proximal end back cover portion 22 can be flexibly changed corresponding to an amount, the number, the size or the like of bound articles J that are bound by the binder B.

The proximal end back cover portion 22 has a lateral width size that is set approximately equal to or shorter than the lateral width size w1 of the spine cover 3. In this embodiment, the lateral width size of the proximal end back cover portion 22 is set shorter than the lateral width size w1 of the spine cover 3. The back cover body portion 21 forms a main portion of the back cover 2.

The back cover 2 includes second communication holes a2 that are communication holes allowing binding rings R(f), R(r) disposed on a front side and a rear side of the binder B to pass therethrough such that the back cover 2 can change its posture between the spread posture (H) and the closed posture (T). The second communication holes a2 allow right portions that form the binding rings R(f), R(r) disposed on the front side and the rear side of the binder B, that is, first ring forming portions d1(*f*), d1(*r*) disposed on the front side and the rear side of the binder B, to pass therethrough.

The second communication hole a2 is formed over the back cover body portion 21 and the proximal end back cover portion 22 that form the back cover 2. A size w5 of the second communication hole a2 in the lateral direction is set shorter than a size w4 of the first communication hole a1 in the lateral direction.

<Spine Cover 3>

The spine cover 3 is disposed between the front cover 1 and the back cover 2. A lateral width size w1 of the spine cover 3 is set longer than a lateral width size w2 of a base portion d2 that forms the binder B and shorter than a lateral width size w3 of the binding rings R(f), R(r) disposed on the front side and the rear side of the binder B that take a closed posture (C).

The binder B is mounted on a front end portion (an end portion close to a user) and a rear end portion (an end portion on a back side) of the spine cover 3 respectively such that the binders B are disposed in a spaced-apart manner from each other. That is, in the file, two binders B are disposed on the spine cover 3 in a state where the binders B are spaced apart from each other in the longitudinal direction. Through holes 31 are formed in the spine cover 3. Engaging protruding portions g2 of a mounting jig G for mounting the respective binders B pass through the through holes 31.

<Hinge Portions N, Intermediate Hinge Portions cn>

The hinge portions N and the intermediate hinge portions cn are so-called resin hinges. That is, the hinge portions N and the intermediate hinge portions cn are formed thinner than the front cover body portion 11, the proximal end front cover portion 12, the spine cover 3, the back cover body portion 21 and the proximal end back cover portion 22 so that the hinge portions N and the intermediate hinge portions cn are easily deformable.

The front cover 1 and the back cover 2 may adopt the configuration where the intermediate hinge portions cn are not provided.

<<Binder B>>

The binder B includes: the binding rings R(f), R(r) that are disposed on front and rear sides and can take the open posture (P) and the closed posture (C); and the single base portion d2 disposed on a proximal end side of the front and rear binding rings R(f), R(r) and mounted on an inner surface of the spine cover 3.

The binder B has: a first binder member D provided with first ring forming portions d1(*f*), d1(*r*) disposed on the front and rear sides that form binding rings R(f), R(r) disposed on front and rear sides; and a second binder member E provided with second ring forming portions e1(*f*), e1(*r*) disposed on the front and rear sides that form the binding rings R(f), R(r) disposed on front and rear sides.

The binder B is configured such that the binder B can take the closed posture (C) where respective distal end portions of the first and second ring forming portions d1(*f*), d1(*r*), e1(*f*), e1(*r*) disposed on front and rear sides engage with each other, and the open posture (P) where the respective distal end portions of the first and second ring forming portions d1(*f*), d1(*r*), e1(*f*), e1(*r*) disposed on the front and rear sides are spaced apart from each other.

To be more specific, the binder B is configured to allow the second binder member E to rotate relative to the first binder member D so that the binder B can take the closed posture (C) where the binding rings R(f), R(r) disposed on front and rear sides form a closed loop shape, and the open posture (P) where the binding rings R(f), R(r) disposed on front and rear sides do not form a closed loop shape.

<First Binder Member D>

The first binder member D is formed as an integral body using a synthetic resin. The first binder member D is configured to be mounted on an inner surface side of the spine cover 3 using the mounting jig G.

The first binder member D includes: the base portion d2 in which a shaft portion accommodating space sp that is opened at least downward so as to allow the mounting of the shaft portion e2 of the second binder member E; and first ring forming portions d1(*f*), d1(*r*) disposed on front and rear sides that are integrally formed with the base portion d2, extend from the base portion d2 and constitute the binding rings R(f), R(r) disposed on front and rear sides. The shaft portion accommodating space sp of the base portion d2 is formed in a center portion of the base portion d2 in the longitudinal direction (the center portion in the front-and-rear direction).

[Base Portion d2]

The base portion d2 includes: engaging holes 4*f*, 4*r* disposed on front and rear sides that are formed in both end portions of the base portion d2 in the longitudinal direction and form engaging portions with which the engaging protruding portions g2 of the mounting jig G engage; a pair of shaft support portions 5*f*, 5*r* that are capable of rotatably supporting both end portions of the shaft portion e2 disposed on the second binder member E; a through hole M that is disposed between the shaft support portion 5*f* on the front side and the shaft support portion 5*r* on the rear side and penetrates the base portion d2 vertically; and cutoff portions Y on front and rear sides that are disposed between the engaging holes 4*f*, 4*r* on the front and rear sides and the through holes M and are provided for avoiding the interference of the base portion d2 with the second ring forming portions e1(*f*), e1(*r*) disposed on front and rear sides of the second binder member E.

The engaging holes 4*f*, 4*r* disposed on front and rear sides are formed in the base portion d2 at positions outside (at the front side and the rear side of) the portion where the shaft portion accommodating space sp is formed. The engaging holes 4*f*, 4*r* disposed on front and rear sides are provided for mounting the base portion d2 on the spine cover 3 in a cooperative manner with the mounting jig G in a state where a bottom surface side of the base portion d2 is brought into contact with an inner surface of the spine cover 3.

The shapes of portions of the base portion d2 in the vicinity of the engaging holes 4*f*, 4*r* on front and rear sides, that is, the respective shapes of the front and rear end portions of the base portion d2 are set different from each other as viewed with naked eyes for the sake of convenience in suppressing the erroneous recognition of the posture at the time of performing a mounting operation.

The shaft support portions 5*f*, 5*r* disposed on front and rear sides are capable of rotatably supporting both end portions of the shaft portion e2 which has an approximately circular columnar shape. The shaft support portions 5*f*, 5*r* disposed on front and rear sides include: shaft support wall body portions 51, 52 disposed in a spaced-apart manner in the lateral direction with the shaft accommodating space sp formed therebetween; a shaft support wall body portion 53 on an upper side that connects upper end portions of the shaft support wall body portions 51, 52 disposed on left and right sides such that the shaft support wall body portion 53 faces the shaft portion accommodating space sp on a lower surface side; and removal preventing protrusions v that are disposed in a protruding manner from an inner side of the shaft support wall body portion 52 on the right side to the shaft support wall body portion 51 on the left side.

When the shaft portion e2 of the second binder member E is accommodated in the shaft portion accommodating space sp from a side below the base portion d2, the removal of the shaft portion e2 is prevented by the removal preventing protrusions v that constitute the shaft support portions 5*f*, 5*r* disposed on front and rear sides and hence, it is possible to make the removal of the shaft portion e2 from the shaft accommodating portion sp difficult.

The through hole M consists of: the left and right intermediate wall body portion 6, 7 arranged spaced apart from each other on the left and on the right by way of the shaft accommodating space sp; and front and rear connecting portions 8 that connect a front end portion and a rear end portion of the left intermediate wall body portion 6 and the right intermediate wall portion 7.

On longitudinal-direction intermediate portions of the left and right intermediate wall body portions 6, 7, engaging surfaces to be pressed 61, 71 pressed by the protruding portions t of the shaft portion e2 in a step of rotating the second binder member E between the closed posture (C) and the open posture (P) are formed.

The left intermediate wall body portion 6 is supported in a cantilever manner with respect to the right intermediate wall body portion 71 by way of the front and rear connecting portions 7.

[Front and Rear First Ring Forming Portions d1(*f*), d1(*r*)]

The front and rear first ring forming portions d1(*f*), d1(*r*) are partially annular portions formed on the base portion d2 in an extending manner from the base portion d2. Engaging pawls x1 are formed on distal end portions of the front and rear first ring forming portions d1(*f*), d1(*r*) in directions facing each other. That is, the engaging pawl x1 directed inward (rearward) is formed on a distal end portion of the front first ring forming portion d1(*f*) in a protruding manner, and the engaging pawl x1 directed inward (frontward) is formed on a distal end portion of the rear first ring forming portion d1(*r*) in a protruding manner.

<Second Binder Member E>

The second binder member E is formed as an integral body using a synthetic resin. The second binder member E is rotatably supported with respect to the first binder member D.

The second binder member E includes: the shaft portion e2 rotatably supported with respect to the base portion d2; and front and rear second ring forming portions e1(*f*), e1(*r*) that are integrally formed with the shaft portion e2 in an extending manner from the shaft portion e2 and form the front and rear binding rings R(f), R(r).

[Shaft Portion e2]

The shaft portion e2 is a rod-shaped member extending in the longitudinal direction. At least both end portions of the shaft portion e2 in the longitudinal direction are formed in a circular columnar shape such that the both end portions can rotatably engage with the front and rear shaft support portions 5*f*, 5*r*.

Protruding portions t that protrude in the direction orthogonal to an axis s are integrally formed on an intermediate portion of the shaft portion e2 in the longitudinal direction. The protruding portions t are configured to temporarily expand a spaced-apart distance between the wall portions that form a pair forming the through hole M, that is, the left and right intermediate wall bodies 6, 7 in a step where the second binder member E performs a posture change from a closed posture (C) to an open posture (P).

That is, the configuration is adopted where a spaced-apart width w8 between the left and right intermediate wall body portions 6, 7 when the second binder member E is in an intermediate posture (U) between a closed posture (C) and an open posture (P) is longer than a spaced-apart width w7 between the left and right intermediate wall body portions 6, 7 when the second binder member E is in the closed posture (C) or the open posture (P).

The protruding portions t are formed as a pair such that the protruding portions t protrude in the directions opposite to each other with respect to the shaft portion e2. The pair of protruding portions t is formed such that protruding end portions t1 are approximately aligned with an imaginary straight line q that is orthogonal to the axis s of the shaft portion e2.

The pair of protruding portions t protrudes in the oblique direction from the shaft portion e2 in the case where the second binder member E is in a closed posture (C) or an open posture (P).

The pair of protruding portions t protrudes in the approximately horizontal direction from the shaft portion e2 in the case where the second binder member E is in an intermediate posture (U).

In this embodiment, a portion where the shaft portion e2 and the protruding portions t are formed is formed in an approximately lemon shape as viewed in a transverse cross section.

[Front and Rear Second Ring Forming Portions e1(*f*), e1(*r*)]

The front and rear second ring forming portions e1(*f*), e1(*r*) are partially annular portions formed in an extending manner from the shaft portion e2. Engaging pawls x2 are formed on distal end portions of the front and rear second ring forming portions e1(*f*), e1(*r*) in directions directed opposite to each other. That is, the engaging pawl x2 directed outward (frontward) is formed on the distal end portion of the front second ring forming portion e1(*f*), and the engaging pawl x2 directed outward (rearward) is formed on the distal end portion of the rear second ring forming portion e1(*r*).

A user, using his/her fingers, temporarily elastically deforms the front and rear second ring forming portions e1(*f*), e1(*r*) in the directions that the front and rear second ring forming portions e1(*f*), e1(*r*) approach to each other so as to release the engagement between the distal end portions of the front and rear second ring forming portions e1(*f*), e1(*r*) and the distal end portions of the front and rear first ring forming portions d1(*f*), d1(*r*). Then, the user rotates the second binder member E with respect to the first binder member D so as to change the posture of the front and rear binding rings R(f), R(r) in a closed posture (C) in the direction toward an open posture (P).

<<Mounting Jig G>>

The mounting jig G is provided for mounting the base portion d2 on an inner surface of the spine cover 3. The mounting jig G is made of a synthetic resin.

The mounting jig G includes: a mounting base g1 that is disposed on an outer surface side of the spine cover 3; and engaging protruding portions g2 that are formed on the mounting base g1 in a protruding manner, pass through the through holes 31 formed in the spine cover 3 and engage with the front and rear engaging holes 4*f*, 4*r* that form engaging portions formed on the base portion d2.

The mounting base g1 is attached to an outer surface of the spine cover 3 in a contact manner. The mounting base g1 is formed in a rectangular plate shape extending along the longitudinal direction of the spine cover 3. A lateral width size w6 of the mounting base g1 is set shorter than a lateral width size w1 of the spine cover 3.

On left and right side edge portions of the mounting base g1, notched portions g11 are formed for avoiding the interference between the mounting base g1 and the front and rear second ring forming portions e1(*f*), e1(*r*) that form movable ring portions.

The mounting jig G has a left-and-right symmetrical shape and hence, even when the left and the right of the mounting jig G are reversed, the mounting jig G is appropriately engageable with the base portion d2 of the binder B.

The engaging protruding portions g2 are formed on both end portions of the mounting base g1 in the longitudinal direction. The engaging protruding portion g2 consists of two pawl portions g21 spaced apart from each other. A return stop protrusion tk is formed on a distal end portion of each of two pawl portions g21 that form the engaging protruding portion g2.

Two engaging protruding portions g2 that are formed on the mounting base g1 engage with the front and rear engaging holes 4*f*, 4*r* formed on the base portion d2 of the binder B in a fixedly fitting state.

Next, the description is made with respect to the manner of operation of the binder B when the posture of the front and rear binding rings R(f), R(r) that are in a closed posture (C) is changed to an open posture (P) by way of an intermediate posture (U).

First, when the front and rear binding rings R(f), R(r) are in a closed posture (C), the engaging pawls x1 that are respective distal end portions of the front and rear first ring forming portions d1(*f*), d1(*r*) and the engaging pawls x2 that are respective distal end portions of the front and rear second ring forming portions e1(*f*), e1(*r*) engage with each other.

From this state, a user, using his/her fingers, performs a manipulation for rotating the second binder member E that has the front and rear second ring forming portions e1(*f*), e1(*r*) toward the first binder member D while temporarily elastically deforming the front and rear second ring forming portions e1(*f*), e1(*r*) in the directions that the front and rear second ring forming portions e1(*f*), e1(*r*) approach to each other so as to release the engagement between the engaging pawls x1, x2 in an engagement state.

At this stage of the operation, in a step where the second binder member E performs a posture change from a closed posture (C) to an intermediate posture (U), the pair of protruding portions t formed on the shaft portion e2 temporarily expands a spaced-apart width between the left and right intermediate wall body portions 6, 7 in which the through hole M is formed.

That is, the left intermediate wall body portion 6 supported by the right intermediate wall body portion 7 in a cantilever manner by way of the front and rear connecting portions 8 is pressed to the protruding portions t when the second binder member E performs a posture change from a closed posture (C) to an intermediate posture (U) and hence, the left intermediate wall body portion 6 is temporarily elastically deformable in the direction away from the right intermediate wall body portion 5.

That is, the shaft portion e2 that has the pair of protruding portions t presses the left and right intermediate wall body portions 6, 7 in a bulging manner toward the outside in the step of performing a posture change from a closed posture (C) to an intermediate posture (U).

The pair of protruding portions t that extend in the oblique direction in the closed posture (C) protrudes in the approximately horizontal direction in the intermediate posture (U). In the intermediate posture (U), the shaft portion e2 having the pair of protruding portions t becomes longer in the lateral width direction than at the time that the closed posture (C) is taken. Accordingly, the shaft portion e2 having the pair of protruding portions t presses the left intermediate wall body portion 6 toward the outside against an elastic restoring force of the member where the left intermediate wall body portion 6 intends to return to the original position so that the spaced-apart distance between the left and right intermediate wall body portions 6, 7 is temporarily expanded.

When the shaft portion e2 having the pair of protruding portions t further rotates from such a state, that is, when the shaft portion e2 rotates from the intermediate posture (U) to the open posture (P), the left intermediate wall body portion 6 presses portions of the protruding portion t on one side other than a vertex portion because of an elastic restoring force generated by the left intermediate wall body portion 6 that intends to return toward the original position. The second binder member E that receives a biasing force is biased in the open posture (P) direction and rotates until the second binder member E reaches the open posture (P).

Through the above-mentioned steps, the second binder member E takes the open posture (P) from the closed posture (C) by way of the intermediate posture (U) and, at the same time, the second binder member E can acquire the stable state where the reverse rotation of the second binder member E is substantially prevented.

The second binder member E is also configured such that the second binder member E can be rotated to the closed posture (C) from the open posture (P) by way of the intermediate posture (U) by allowing a user to perform the above-mentioned steps in an opposite manner by a manipulating force of the user.

As described above, the file according to the present invention includes the cover A and the back cover B.

The cover A has the front cover 1, the spine cover 3 and the back cover 2 that are connected to each other by way of the hinge portion N. The cover A is configured to take the spread posture (H) where the front cover 1 and the back cover 2 can be developed to become coplanar with each other, and a closed posture (T) where the respective inner surfaces of the front cover 1 and the back cover 2 face each other.

The binder B includes: the front and rear binding rings R(f), R(r) configured to be capable of taking an open posture (P) and a closed posture (C); and the base portion d2 mounted on an inner surface of the spine cover 3. The first communication holes a1 are formed in the front cover 1, and the second communication holes a2 are formed in the back cover 2. These first communication holes a1 and the second communication holes a2 allow the front and rear binding rings R(f), R(r) to pass therethrough thus enabling the front cover 1 and the back cover 2 to perform a posture change between the spread posture (H) and the closed posture (T).

With such a configuration, according to the file of the present embodiment, in the configuration where the binder B is disposed on the inner surface of the back surface 3, it is possible to provide the file that suitably takes not only the spread posture (H) of the cover A but also the closed posture (T) of the cover A.

That is, the base portion d2 of the binder B is mounted on the inner surface of the spine cover 3 and hence, the file according to the embodiment can suitably take the spread posture (H) of the cover A on the mounting surface of the top plate or the like.

Further, the file can take the suitable closed posture (T) of the cover A. That is, the first communication holes a1 in the front cover 1 and the second communication holes a2 are formed in the back cover 2. Because of the formation of the first communication holes a1 and the second communication holes a2, the front cover 1 and the back cover 2 minimally interfere with the front and rear binding rings R(f), R(r) of the binder B.

In other words, because of the formation of the first communication holes a1 and the second communication holes a2, it is substantially possible to prevent the well-ordered closed posture (T) of the front cover 1 and the back cover 2 from being damaged. The cover A that takes the closed posture (T) can acquire a suitable external appearance where the cover A has a relatively thin configuration as a whole by a cooperative operation of the front cover 1 and the back cover 2.

The file includes the mounting jig G for mounting the base portion d2 on the inner surface of the spine cover 3. The mounting jig G includes: the mounting base g1 disposed on the outer surface side of the spine cover 3; and the engaging protruding portions g2 that are formed on the mounting base g1 in a protruding manner, pass through the spine cover 3, and engage with the front and rear engaging holes 4*f*, 4*r* that are the engaging portions formed on the base portion d2.

With such a configuration, the binder B can be suitably mounted on the inner surface side of the spine cover 3 using the mounting jig G.

The engaging protruding portion g2 is formed in a protruding manner on each of both end portions of the mounting base g1 in the longitudinal direction. These engaging protruding portions g2 engage with the front and rear engaging holes 4*f*, 4*r* in a fixedly fitting state.

With such a configuration, it is possible to prevent the binder B that is mounted on the spine cover 3 by the mounting jig G from being easily removed from the spine cover 3.

The lateral width size w1 of the spine cover 3 is set approximately equal to or longer than the lateral width size w2 of the base portion d2, and is set shorter than the lateral width w3 of the front and rear binding rings R(f), R(r).

With such a configuration, the lateral width w2 of the base portion d2 of the binder B is set to a value that allows the base portion d2 to be suitably mounted on the spine cover 3. Further, the front and rear binding rings R(f), R(r) of the binder B are configured to be capable of easily binding the bound articles J.

The cover A is configured to perform a posture change so as to take a folded posture (K) where the respective outer surfaces of the front cover 1 and the back cover 2 face each other.

With such a configuration, by allowing the cover A to take the folded posture (K), the file can increase user convenience.

The binder B includes: the front and rear first binder members D having the base portion d2 and the front and rear first ring forming portions d1(*f*), d1(*r*) that are binding rings extending from the base portion d2 and form the front and rear binding rings R(f), R(r); and the second binder member E having the front and rear ring forming portions e1(*f*), e1(*r*) that form the front and rear binding rings R(f), R(r).

The second binder member E is configured to be rotatable relative to the first binder member D so as to take the closed posture (C) where the distal end portions of the first ring forming portions d1(*f*), d1(*r*) and the distal end portions of the second ring forming portions e1(*f*), e1(*r*) engage with each other, and the open posture (P) where the distal end portions of the first ring forming portions d1(*f*), d1(*r*) and the distal end portions of the second ring forming portions e1(*f*), e1(*r*) are spaced apart from each other.

With such a configuration, with the first and second binder members D, E, the binder B can suitably bind the bound articles J.

The first binder member D and the second binder member E are respectively made of a synthetic resin.

With such a configuration, the binder B has excellent flexibility in elastic deformation and excellent degree of freedom in designing that enables the reduction of weight and the formation of the binder having a complicated shape.

The present invention is not limited to the embodiment described above in details.

In the base portion of the first binder member, a recessed portion that opens upward may be formed in place of the through hole that penetrates vertically. Also with such a configuration, the protruding portion of the second binder member can temporarily expand a spaced-apart width between a pair of wall body portions that form the recessed portion and hence, the desired object can be achieved.

The first binder member and the second binder member are not limited to the members configured to be rotatable relative to each other. For example, the first binder member and the second binder member may be displaced from each other by the slide movement or the like, and may take a closed posture where respective distal end portions of the first and second ring forming portions engage with each other and an open posture where the respective distal end portions of the first and second ring forming portions are spaced apart from each other.

The protruding portion may not be limited to the protruded portion formed on the shaft portion. It is sufficient that the protruding portion is formed on the second binder member.

Various shapes are considered as the shapes of the communication holes formed in the front cover and the back cover. Accordingly, the shapes of the communication holes formed in the front cover and the back cover are not limited to the shapes illustrated in the embodiment described above.

As the aspect in which the base portion of the binder is mounted on the inner surface of the spine cover, a suitable aspect can be adopted. For example, the base portion of the binder may be mounted on the inner surface of the spine cover using an adhesive agent in place of the mounting jig.

As the mounting jig, a single mounting jig may be used, or a plurality of (more than one) mounting jigs may be used. In other words, two binders may be mounted on the back cover of the cover using one mounting jig. One binder may be mounted on the spine cover using two or more mounting jigs.

The engaging protruding portions may not engage with the engaging portion in a fixedly fitting state.

The engaging portion is not limited to the engaging hole, and may be formed in any shape provided that the engaging portion has the structure that allows the engaging portion to engage with the engaging protruding portion.

The lateral width size of the spine cover may be set approximately equal to the lateral width size of the base portion.

The cover may adopt the configuration where the cover cannot take a folded posture that allows the respective outer surface of the front cover and the outer surface of the back cover to face each other.

Furthermore, the specific configurations of the respective portions are not limited to the configurations described in the above-mentioned embodiment, and various modifications are conceivable without departing from the spirit of the present invention.

REFERENCE SIGNS LIST

A: cover
1: front cover
2: back cover
3: spine cover
B: binder
D: first binder member
E: second binder member
G: mounting jig

The invention claimed is:

1. A file comprising:

a cover; and a binder, wherein the cover has a front cover, a spine cover and a back cover connected to each other by way of a hinge portion, and is configured to be capable of performing a posture change such that the cover takes a spread posture where the front cover and the back cover can be spread to be approximately coplanar with each other and a closed posture where the respective inner surfaces of the front cover and the back cover can face each other, wherein the binder includes: a binding ring configured to be capable of taking an open posture and a closed posture; and a base portion mounted on an inner surface of the spine cover, wherein the front cover and the back cover each include a communication hole that allows the binding ring to pass therethrough thus enabling the cover to perform a posture change between the spread posture and the closed posture, and wherein the communication hole formed in the front cover extends to the spine cover.

2. The file according to claim 1, further comprising a mounting jig that mounts the base portion on an inner surface of the spine cover, wherein the mounting jig includes: a mounting base disposed on an outer surface side of the spine cover; and an engaging protruding portion protruding from the mounting base, penetrating the spine cover, and engaging with an engaging portion formed on the base portion.

3. The file according to claim 2, wherein the engaging protruding portion is formed in a protruding manner on both end portions of the mounting base in a longitudinal direction, and the engaging protruding portions engage with the engaging portions in a fixedly fitting state.

4. The file according to claim 2, wherein the engaging protruding portion includes a plurality of pawl portions spaced apart from each other, and a return stop protrusion is formed on a distal end portion of each of the plurality of pawl portions.

5. The file according to claim 1, wherein a lateral width size of the spine cover is set approximately equal to or longer than a lateral width size of the base portion, and the lateral width size of the spine cover is set approximately equal to or shorter than a lateral width size of the binding ring.

6. The file according to claim 1, wherein the cover is configured to be capable of performing a posture change so as to take a folded posture where an outer surface of the front cover and an outer surface of the back cover face each other.

7. The file according to claim 1, wherein the binder includes:

a first binder member having the base portion and a first ring forming portion that extends from the base portion and forms a first portion of the binding ring; and a second binder member provided with a second ring forming portion that forms a second portion of the binding ring, wherein the second binder member is configured to be rotatable relative to the first binder member so as to take the closed posture where the distal end portion of the first ring forming portion and the distal end portion of the second ring forming portion engage with each other and the open posture where the distal end portion of the first ring forming portion and the distal end portion of the second ring forming portion are spaced apart from each other.

8. The file according to claim 7, wherein the first binder member and the second binder member are respectively made of a synthetic resin.

9. The file according to claim 7, wherein the second binder member includes a shaft portion rotatably supported with respect to the base portion, and the second ring forming portion extends from the shaft portion.

10. The file according to claim 9, wherein the shaft portion includes a protruding portion that protrudes in a direction orthogonal to an axis of the shaft portion, and the base portion includes a pair of wall body portions that define a space therebetween in which the shaft portion is accommodated, the protruding portion being configured to temporarily expand a spaced-apart distance between the pair of wall body portions when the second binder member performs a posture change between the closed posture and the open posture.

11. The file according to claim 1, wherein the communication hole formed in the back cover is formed over a back cover body portion and a proximal end back cover portion that form the back cover.

12. The file according to claim 1, wherein a lateral width size of the communication hole formed in the front cover is set longer than a lateral width size of the communication hole formed in the back cover.

13. The file according to claim 1, wherein the front cover includes: a front cover body portion; a proximal end front cover portion disposed adjacent to the spine cover by way of the hinge portion; and an intermediate hinge portion connecting the front cover body portion and the proximal end front cover portion to each other.

14. The file according to claim 13, wherein the hinge portion and the intermediate hinge portion are formed thinner than the front cover body portion, the proximal end front cover portion, and the spine cover.

15. The file according to claim 1, wherein the binder is provided as a plurality of binders, the plurality of binders being disposed on the spine cover in a state where the plurality of binders are spaced apart from each other in a longitudinal direction of the spine cover.

* * * * *